(12) United States Patent
Yamashita (10) Patent No.: US 6,652,406 B2
(45) Date of Patent: Nov. 25, 2003

(54) TRANSMISSION

(76) Inventor: Masaaki Yamashita, 4-3-18, Inabaso, Amagasaki-shi, Hyogo (JP)

( * ) Notice: Subject to any disclaimer, the term of this patent is extended or adjusted under 35 U.S.C. 154(b) by 10 days.

(21) Appl. No.: 10/006,720

(22) Filed: Dec. 10, 2001

(65) Prior Publication Data

US 2003/0013572 A1 Jan. 16, 2003

(30) Foreign Application Priority Data

Jul. 12, 2001 (JP) ........................................ 2001-211720

(51) Int. Cl.$^7$ .............................................. F16H 23/00
(52) U.S. Cl. ........................... 475/169; 475/162; 74/63; 464/1; 464/136
(58) Field of Search ................................ 475/162, 163, 475/169; 74/63, 86; 464/1, 2, 136

(56) References Cited

U.S. PATENT DOCUMENTS

| | | | |
|---|---|---|---|
| 4,326,748 A | * 4/1982 | Brusasco | 297/362 |
| 5,893,813 A | * 4/1999 | Yamamoto | 475/163 |
| 6,113,511 A | * 9/2000 | Baker | 475/163 |

* cited by examiner

*Primary Examiner*—Ankur Parekh
(74) *Attorney, Agent, or Firm*—Armstrong, Westerman & Hattori, LLP (57) ABSTRACT

A transmission provided with an input shaft and an output shaft supported on a first axis so as to freely rotate. The transmission is also provided with a transmission eccentric shaft mounted on the input shaft so as to freely rotate, the eccentric shaft having a declination axis crossing the first axis with a predetermined angle; a transmission input plate mounted on the transmission eccentric shaft so as to freely rotate around the declination axis; and an output eccentric shaft supported on an end portion of the input shaft on the output shaft side so as to freely rotate, where the output eccentric shaft is arranged on the declination axis. A casing portion is mounted on the output eccentric shaft so as to rotate around the declination axis and is provided with a revolution force around the first axis by contact with the transmission input plate, a universal joint portion having a joint main body connecting the casing portion with the input shaft, and a transmission apparatus for changing the revolution speed of the transmission input plate by rotation of the transmission eccentric shaft, are provided. The output shaft is unitedly attached to the output eccentric shaft.

2 Claims, 10 Drawing Sheets

TRANSMISSION

BACKGROUND OF THE INVENTION

1. Field of the Invention

This invention relates to a transmission.

2. Description of the Related Art

As a transmission used for machine tools, industrial machinery, construction machinery, agricultural equipment, cars, etc., an electrically-controlled transmission such as inverter, servo motor, etc., is conventionally known.

However, in this conventional transmission, efficiency is poor, resulting in insufficient output of low torque in low-speed zone. In a transmission used for automobile without electric power, control becomes difficult and construction of the transmission becomes complicated.

SUMMARY OF THE INVENTION

It is therefore an object of the present invention to provide a transmission having a simple construction, which is easy to make and handle, and highly efficient over a wide range of speeds.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
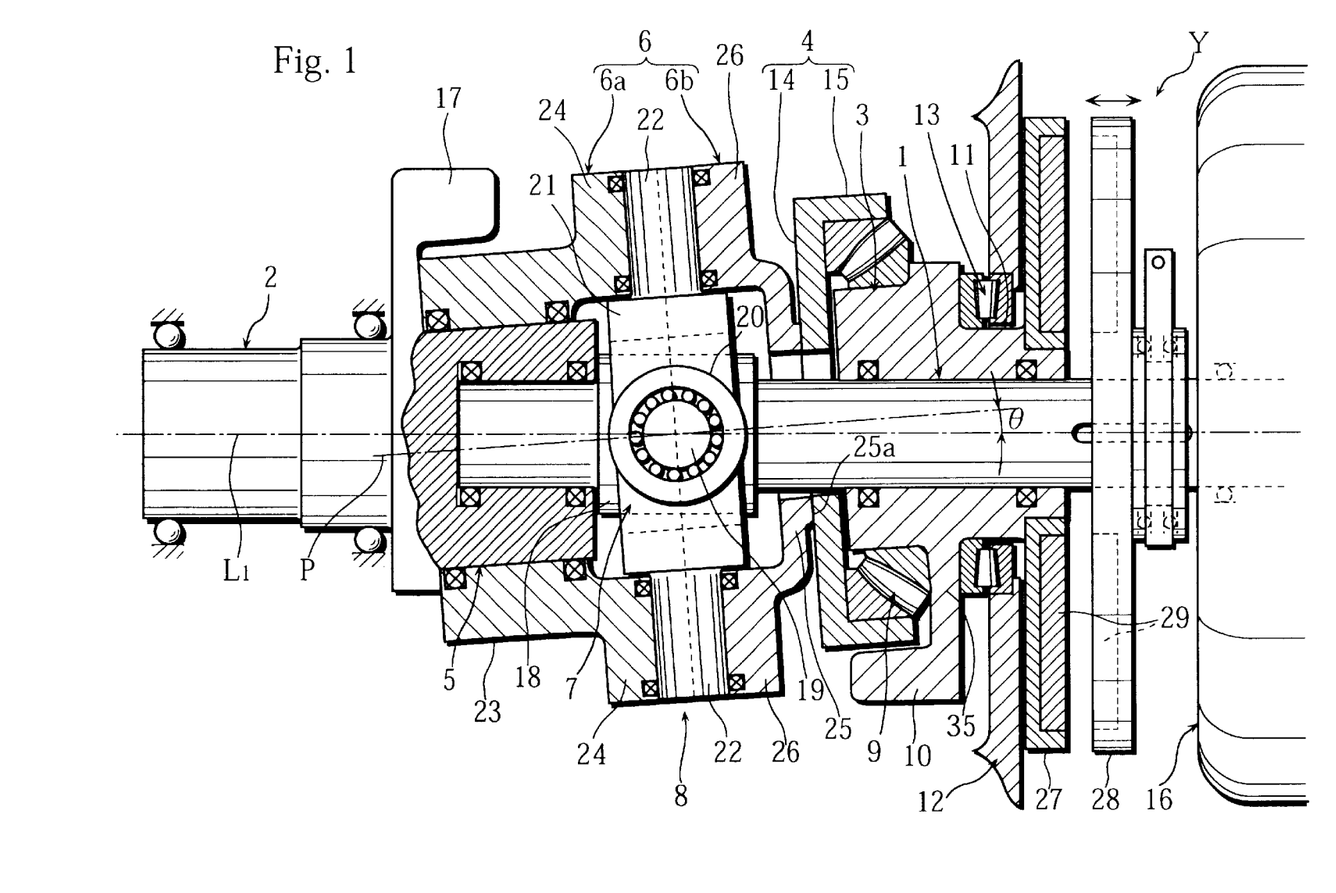
FIG. 1 is a cross-sectional view showing a first embodiment of a transmission relating to the present invention.

FIG. 1 shows an embodiment (first embodiment) of a transmission relating to the present invention. This transmission is provided with an input shaft 1 and an output shaft 2 supported on a first axis $L_1$ so as to freely rotate, a transmission eccentric shaft 3 mounted on the input shaft 1 so as to freely rotate, said transmission eccentric shaft having a declination axis P crossing with the first axis $L_1$ with a predetermined angle θ, a transmission input plate 4 mounted on the transmission eccentric shaft 3 so as to rotate around the declination axis P and revolve around the first axis $L_1$, an output eccentric shaft 5 axially-supported on an end portion of the input shaft 1 to the output shaft 2 side and of which axis is the declination axis P, a universal joint portion 8 having a casing portion 6 mounted on the output eccentric shaft 5 so as to rotate around the declination axis P and revolve around the first axis $L_1$ and given revolution force around the first axis $L_1$ by contact with the transmission input plate 4 and a joint main body 7 connecting the casing portion 6 with the input shaft 1, the output shaft 2 formed unitedly with the output eccentric shaft 5, and a transmission means Y to change the revolution speed of the transmission input plate 4 by rotation of the transmission eccentric shaft 3.

More particularly, the input shaft 1 and the output shaft 2 are supported by a fixation member such as a casing so as to freely rotate around the first axis $L_1$. A base end side of the input shaft 1 is connected to a driving source 16 and is driven to rotate, and a forth end side of the output shaft 2 is connected to a machine which is driven. In FIG. 1, the left side is the forth end side and the right side is the base end side.

The output eccentric shaft 5 has a concave portion opening to the input shaft 1 side on the first axis $L_1$, and is mounted so as to be attached to an end portion of the input shaft 1 through a bearing. The output eccentric shaft 5 is provided with a balance weight 17 on the forth end side, and is continued (connected) to the output shaft 2 unitedly.

The cylindrical transmission eccentric shaft 3 having the declination axis P is mounted so as to be attached to the input shaft 1 through a bearing, having an outer brim portion 35 on a base end side on a peripheral face, an inner circle of an automatic aligning roller bearing 9 is fixed to a corner portion of the peripheral face and the outer brim portion 35, and a balance weight 10 is attached to a part of the outer brim portion 35. The automatic aligning roller bearing 9 may be a thrust automatic aligning roller bearing. A cylinder portion 11 outserted to the input shaft 1 through a bearing is continued from a base end face (at right angles with the first axis $L_1$) of the transmission eccentric shaft 3. 12 is a fixation member such as a casing, and a thrust bearing 13 is disposed between an inner periphery of a hole portion of the fixation member 12 and the base end face of the transmission eccentric shaft 3.

The transmission input plate 4 is composed of a disc portion 14 having a central hole portion for insertion of the input shaft 1 and a peripheral wall portion 15 protruding from a peripheral edge of the disc portion 14 to the base end side. A corner portion of the disc portion 14 and the peripheral wall portion 15 is fixed to an outer circle of the automatic aligning roller bearing 9.

The joint main body 7 of the universal joint portion 8 has a first shaft 19 disposed in a direction at right angles with the first axis $L_1$ (a direction at right angles with the face of FIG. 1) so as to penetrate a large diameter portion 18 of the input shaft 1 (a part between the output eccentric shaft 5 and the transmission input plate 4), a ring portion 21 disposed on a peripheral side of the large diameter portion 18 of the input shaft 1 and having boss portions 20 (only one of them is shown in FIG. 1) supporting the both ends of the first shaft 19, and a pair of second shafts 22 on a peripheral face of the ring portion 21 protruding in a direction at right angles with the first shaft 19 and the declination axis P.

The casing portion 6 of the universal joint portion 8 is composed of a half body 6a on the forth end side and a half body 6b on the base end side (connected with bolts and screws not shown in Figures). The half body 6a on the forth end side has a cylinder portion 23 mounted on the output eccentric shaft 5 through a bearing and a pair of arc wall portions 24 on a base end side of the cylinder portion 23. The half body 6b on the base end side has a force-receiving plate portion 25 having a central hole portion to which the input shaft 1 is inserted and a circular protruding portion 25a touching the transmission input plate 4, and a pair of arc wall portions 26 disposed on a forth end side of the force-receiving plate portion 25 and cooperating with the pair of arc wall portions 24 to hold the pair of second shafts 22 through a bearing.

The transmission means Y is provided with the (above-mentioned) cylinder portion 11 continuing from the base end side of the transmission eccentric shaft 3, an outer brim member 27 unitedly disposed on the base end of the cylinder portion 11, an outer brim member 28 disposed on the input shaft 1 with a slip key so as to slide in the axis direction and rotate with the input shaft 1, and a magnet 29 composed of one or plural pairs of S poles on the outer brim member 27 and N poles on the outer brim member 28.

Next, the working of the transmission is described. In a state where the outer brim members 27 and 28 of the transmission means Y are sufficiently separated from each other, the transmission eccentric shaft 3 does not rotate (stationary) even if the input shaft 1 rotates. Therefore, the universal joint portion 8 is rotated only around the declination axis P and not revolved around the first axis $L_1$ by the rotation of the input shaft 1. That is to say, the cylinder portion 23 of the universal joint portion 8 is rotating only around the output eccentric shaft 5 which is stationary, and the output shaft 2 is stationary. The transmission input plate 4 is rotating around the declination axis P because of contact with the force-receiving plate portion 25 of the universal joint portion 8.

In this state, as the outer brim member 28 rotating with the input shaft 1 gradually approaches the other outer brim member 27, the outer brim member 27 on the transmission eccentric shaft 3 side begins rotation in the same direction as with the input shaft 1 by magnetic force, and the transmission eccentric shaft 3 revolves around the first axis $L_1$. Then, the transmission input plate 4 rotates around the declination axis P and revolves around the first axis $L_1$, revolving force from the transmission input plate 4 works on the force-receiving plate portion 25 of the universal joint portion 8, the universal joint portion 8 rotates around the declination axis P and revolves around the first axis $L_1$, the output eccentric shaft 5 begins revolution around the first axis $L_1$, and the output shaft 2 begins rotation (in the same direction of the input shaft 1). In this sequence, very little slip is generated between the transmission input plate 4 and the force-receiving plate portion 25.

When the transmission eccentric shaft 3 rotates unitedly with the input shaft 1 with the outer brim members 27 and 28 tightly fit, the output shaft 2 has the same rotation speed as the input shaft 1, and the transmission work is completed thereby. Dynamic balance of the entire transmission is maintained by the balance weights 10 and 17 to restrict vibration in the rotation. To the contrary, as the outer brim members 27 and 28 are pulled apart from each other, the rotation of the output shaft 2 is made slow.

According to this transmission, driving force is smoothly transmitted with very high efficiency and small power loss and transmission work can be conducted with high efficiency over a wide range of speeds because the universal joint portion 8 (without gears) is used for driving force transmission course between the input shaft 1 and the output shaft 2. Working noise is low for silence, and the transmission is compact and made with low cost. The transmission eccentric shaft 3 is not rotated by reaction force and smoothly rotated by the transmission means Y because the transmission input plate 4 works just as a turn table by receiving the reaction force of the output shaft 2 with the automatic aligning roller bearing 9 and the reaction force is returned to the casing portion 6 of the universal joint portion 8. Loss caused by frictional heat can be eliminated with the transmission means Y in which the magnet 29 is used.

Figure 2:
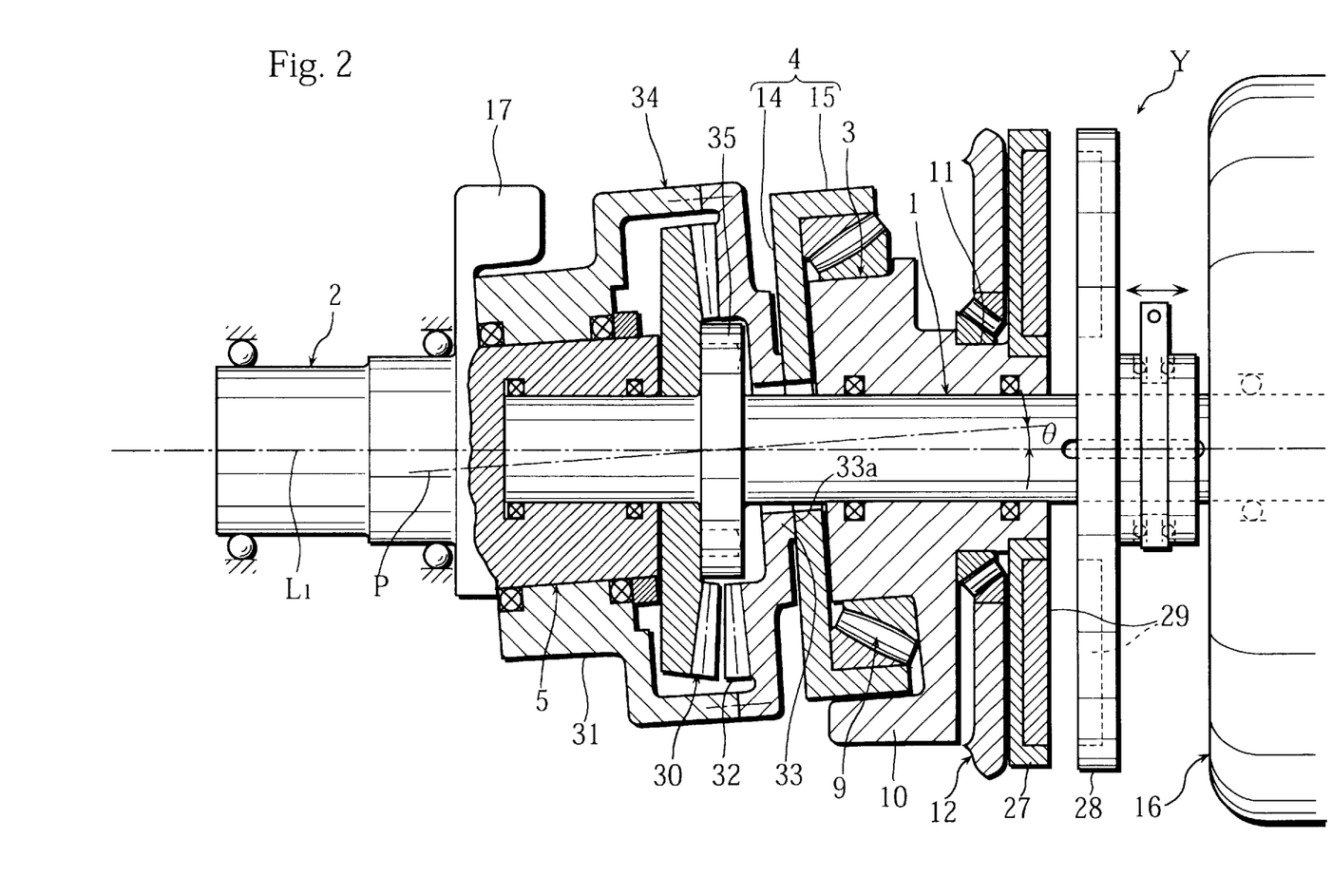
FIG. 2 is a cross-sectional view showing a second embodiment of the present invention.

Next, FIG. 2 shows a second embodiment of the present invention. This transmission, having a construction in which gears are used instead of the universal joint portion 8 described in the transmission shown in FIG. 1, is provided with an input gear 30 rotating unitedly with the input shaft 1 around the first axis $L_1$, a cylinder portion 31 mounted on the output eccentric shaft as to rotate around the declination axis P crossing the first axis $L_1$ with the predetermined angle θ and revolve around the first axis $L_1$, a force-receiving gear portion 32 continuing from the cylinder portion 31 and engaging with the input gear 30, and a rotation body 34 continuing from the force-receiving gear portion 32 and providing revolving force around the first axis $L_1$ by contact with the transmission input plate 4. In this case, a bevel gear is used as the input gear 30, of which teeth are directed to the base end side, fixed to an outer brim portion 35 of the input shaft 1. A crown gear is used as the force-receiving gear portion 32 a part of which is engaged with the bevel gear above.

Although the other constructions are similar to that of the transmission in FIG. 1, the outer diameter of the transmission eccentric shaft 3 and the size of the automatic aligning roller bearing 9 are set to be large (in comparison with the transmission in FIG. 1), the diameter of a circular protruding portion 33a of a force-receiving plate portion 33 to contact the transmission input plate 4 is small, and the effect of the turn table is improved thereby.

In the working of the transmission shown in FIG. 2, (as in the transmission in FIG. 1) the transmission eccentric shaft 3 does not rotate along with the input shaft 1 when the outer brim members 27 and 28 of the transmission means Y are sufficiently separated. The input gear 30 is rotated by the rotation of the input shaft 1 and the force-receiving gear portion 32 engaging with the input gear 30 rotates around the declination axis P (does not revolve around the first axis $L_1$). That is to say, the output eccentric shaft 5 is stationary because the cylinder portion 31 of the rotation body 34 is simply rotating around the output eccentric shaft 5, so the output shaft 2 is stationary.

In this state, as the transmission eccentric shaft 3 is revolved around the first axis $L_1$ by the transmission means Y, the transmission input plate 4, rotating around the declination axis P, begins revolution around the first axis $L_1$ a revolving force of the transmission input plate 4 is given to the force-receiving plate portion 33 of the rotation body 34, and the rotation body 34 rotates around the declination axis P and revolves around the first axis $L_1$. Therefore, the output eccentric shaft 5 revolves around the first axis $L_1$ and the output shaft 2 rotates (in the same direction with the input shaft 1). When the transmission eccentric shaft 3 rotates unitedly with the input shaft 1, the output shaft 2 has the same rotation speed as the input shaft 1, and the transmission work is completed thereby.

The outer brim members 27 and 28 can be small for small transmissive input force (torque) of the transmission means Y by setting the angle θ of the declination axis P to the first axis $L_1$. The rotation body 34 may have a construction, for example, in which the cylinder portion 31 and the force-receiving gear portion 32 are separately made and connected with bolts, etc.

Figure 3:
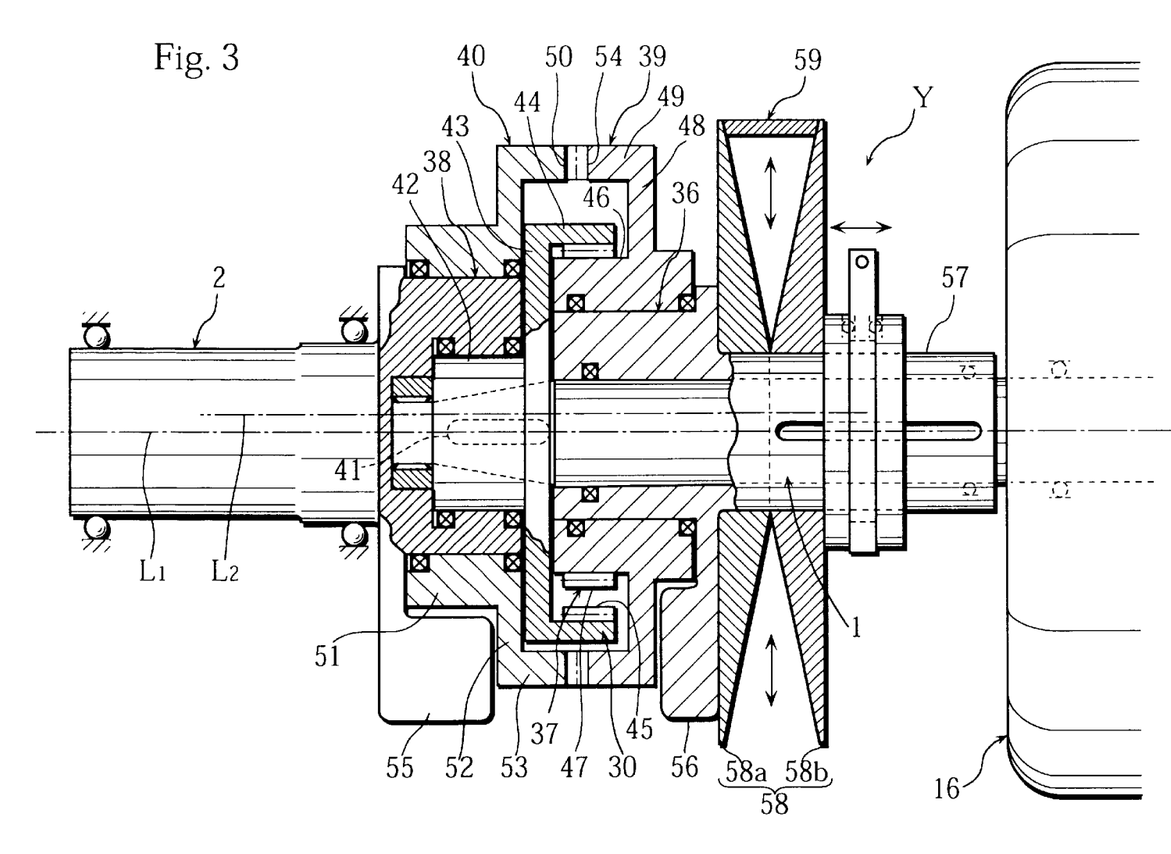
FIG. 3 is a cross-sectional view showing a third embodiment of the present invention.

Next, FIG. 3 shows a third embodiment of the transmission of the present invention. This transmission is provided with an input shaft 1 and an output shaft 2 supported on a first axis $L_1$ so as to freely rotate, an input gear 30 rotating unitedly with the input shaft 1 around the first axis $L_1$, a transmission eccentric shaft 36 mounted on the input shaft 1 so as to freely rotate and parallel to the first axis $L_1$, a force-receiving gear 37 engaged with the input gear 30 and mounted on the transmission eccentric shaft 36 so as to freely rotate around a second axis $L_2$ and revolve around the first axis $L_1$, an output eccentric shaft 38, of which axis is the second axis $L_2$, supported on an end portion of the input shaft 1 on the output shaft 2 side as to freely rotate, a gear-type transmission clutch portion 39 formed unitedly with the force-receiving gear 37 so as to rotate around the second axis $L_2$ and revolve around the first axis $L_1$, a gear-type force-receiving clutch portion 40 mounted on the output eccentric shaft 38 so as to rotate around the second axis $L_2$ and revolve around the first axis $L_1$, and engaged with the gear-type transmission clutch portion 39, the output shaft 2 unitedly formed with the output eccentric shaft 38, and a transmission means Y to change the revolution speed of the force-receiving gear 37 by rotation of the transmission eccentric shaft 36.

The input gear 30 has a cylinder portion 42 attached to a tapered portion (diminishing in diameter toward the forth end side) on the forth end side of the input shaft 1 through a key 41 so as to rotate unitedly with the input shaft 1, a disc portion 43 continuing to an opening base end of the cylinder portion 42, a peripheral wall portion 44 protruding to the base end side along the periphery of the disc portion 43, and an internal gear portion 45 disposed on an inner peripheral face of the peripheral wall portion 44. The output eccentric shaft 38 is attached to the cylinder portion 42 of the input gear 30 through a bearing as to be mounted. The force-receiving gear 37 has a cylinder portion 46 attached to the transmission eccentric shaft 36 through a bearing so as to freely rotate, and an external gear portion 47 disposed on a peripheral face of the cylinder portion 46 and engaging with the internal gear portion 45.

The gear-type transmission clutch portion 39 has an outer brim portion 48 disposed on the peripheral face of the cylinder portion 46 of the force-receiving gear 37, a peripheral wall portion 49 protruding to the forth end side along a periphery of the outer brim portion 48, and a tooth portion 50 on a forth end face of the peripheral wall portion 49. The gear-type force-receiving clutch portion 40 has a cylinder portion 51 attached to the output eccentric shaft 38 through a bearing so as to freely rotate, an outer brim portion 52 continuing from a peripheral face of the cylinder portion 51, a peripheral wall portion 53 protruding to the base end side along a periphery of the outer brim portion 52, and a tooth portion 54 disposed on a base end face of the peripheral wall portion 53 and engaging with the tooth portion 50. In this case, the gear-type transmission clutch portion 39 and the gear-type force-receiving clutch portion 40 are crown-gear type. 55 represents a balance weight formed unitedly with the output eccentric shaft 38 and 56 represents a balance weight formed unitedly with the transmission eccentric shaft 36.

In the transmission means Y, provided with a cylinder portion 57 formed unitedly with a base end face of the transmission eccentric shaft 36 and attached to the input shaft 1 through a bearing so as to freely rotate and a pulley 58 disposed on the cylinder portion 57, another pulley (not shown in Figures) rotated by a motor other than the driving source 16 and the pulley 58 are connected with a belt 59. Further, the pulley 58 is composed of a first half body 58a on the opposite end side fixed to the cylinder portion 57 and a second half body 58b on the base end side rotating unitedly with the cylinder portion 57 and sliding in an axis direction through a slide key, etc. In the transmission means Y, as the motor (not shown in Figures) rotates, the pulley 58 and the transmission eccentric shaft 36 unitedly rotate. The belt 59 slides in a diameter direction of the pulley 58 by making the second half body 58b move closer to or away from the first half body 58a, and the rotation speed of the pulley 58 and the transmission eccentric shaft 36 can be changed thereby.

To describe the working of the transmission, in a static state of the transmission means Y (static state of the transmission eccentric shaft 36), when the input gear 30 is rotated by the input shaft 1, the force-receiving gear 37 and the gear-type transmission clutch portion 39 only rotate around the second axis $L_2$ and do not revolve around the first axis $L_1$. Therefore, the output eccentric shaft 5 is in static state and the output shaft 2 is static because the cylinder portion 51 of the gear-type force-receiving clutch portion 40 engaging with the gear-type transmission clutch portion 39 is only rotating around the output eccentric shaft 5.

In this state, because as the pulley 58 of the transmission means Y is gradually rotated in the same direction with the input shaft 1, the transmission eccentric shaft 3 begins revolution around the first axis $L_1$, and also the force-receiving gear 37, rotating around the second axis $L_2$, revolves around the first axis $L_1$. Therefore, the gear-type transmission clutch portion 39 and the gear-type force-receiving clutch portion 40, rotating around the second axis $L_2$, begin to revolve around the first axis $L_1$, the output eccentric shaft 38 begins revolution around the first axis $L_1$, and the output shaft 2 rotates in the same direction as the input shaft 1. When the transmission eccentric shaft 36 rotates at the same speed with the input shaft 1, the engagement position of the input gear 30 and the force-receiving gear 37 is locked, the revolution of the force-receiving gear 37 around the second axis $L_2$ is stopped and only the rotation around the first axis $L_1$ remains, and the transmission work is completed when the rotation speed of the output shaft 2 becomes the same as that of the input shaft 1. According to the transmission, the output shaft 2 is controlled and changed in speed with an extremely small output. Further, each bearing is protected by letting off the sliding force in the diameter direction with the transmission clutch portion 39 and the force-receiving clutch portion 40 of gear-type (crown gear).

Figure 4:
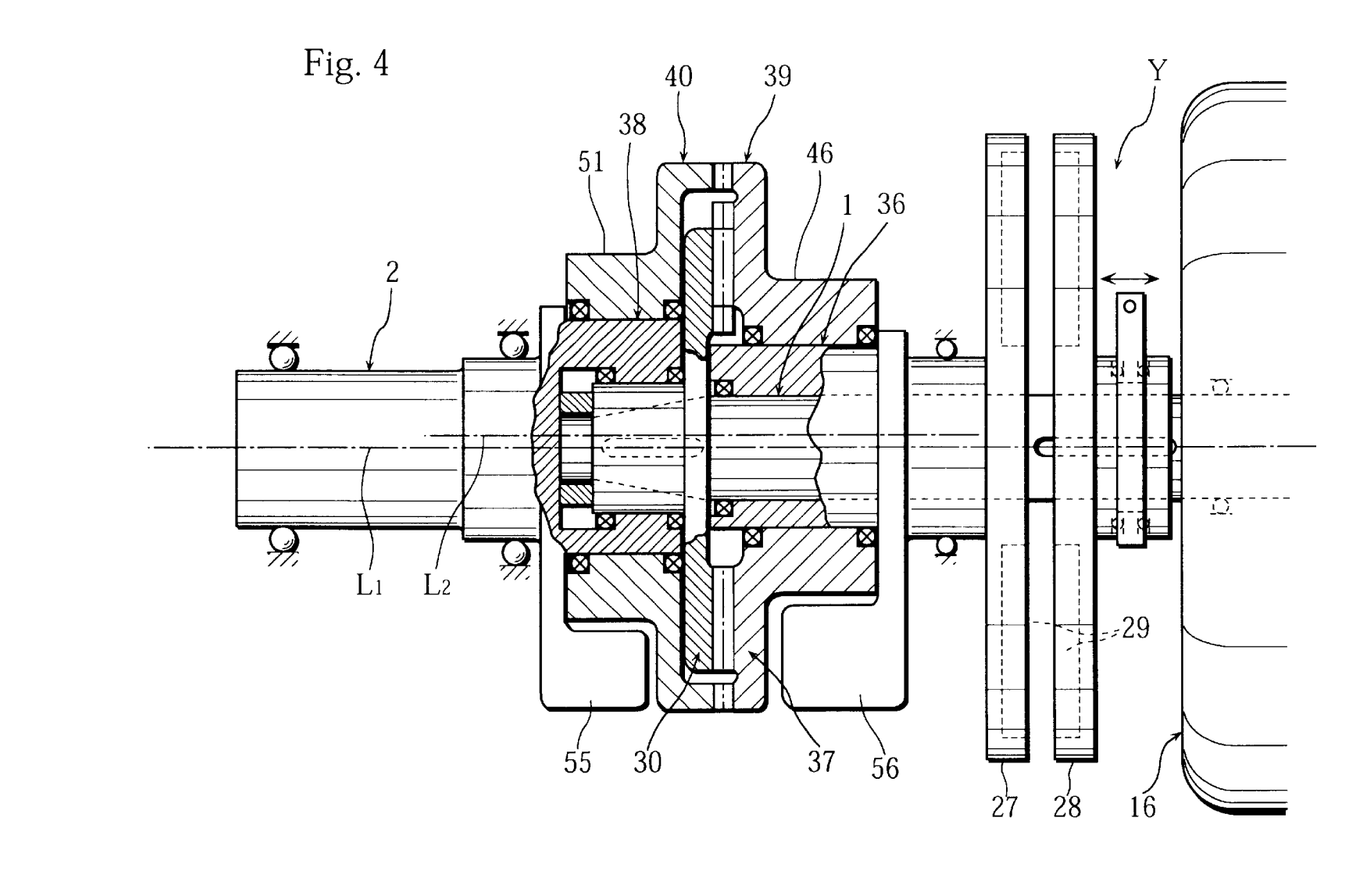
FIG. 4 is a cross-sectional view showing a fourth embodiment of the present invention.
Figure 5:
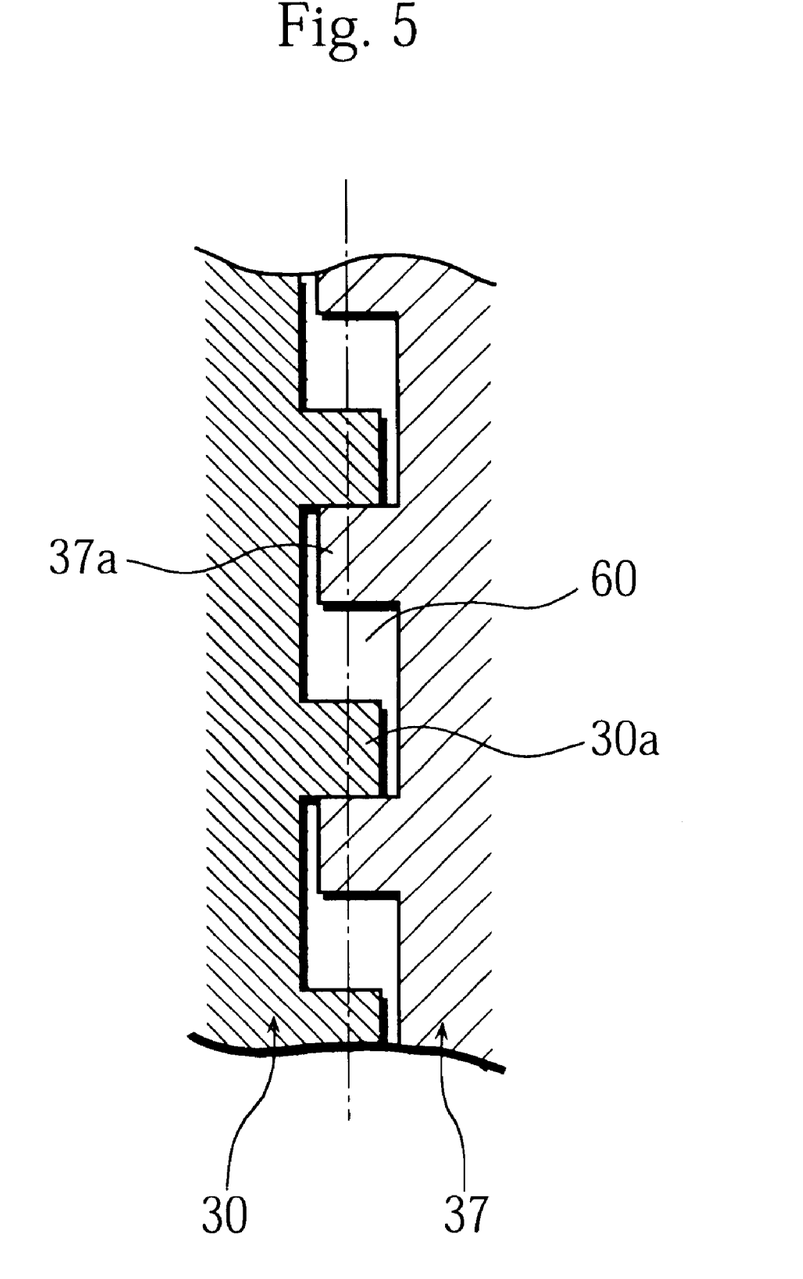
FIG. 5 is a cross-section of a principal part showing an engagement state of an input gear and a force-receiving gear.

Next, FIG. 4 shows a fourth embodiment of the present invention. In this transmission, the input gear 30 and the force-receiving gear 37 described in FIG. 3 are crown gears. In this case, as shown in FIG. 4 and FIG. 5, a gap portion 60 is formed between the tooth $30_a$ of the input gear 30 and the tooth $37_a$ of the force-receiving gear 37 in engagement, the number of teeth is decreased, and the teeth are formed as to slide in the diameter direction with contact faces at right angles with the gears 30 and 37 to reduce abrasion. Further, pressure on the teeth $30_a$ and $37_a$ in high-speed rotation is reduced by making the input gear 30 and the force-receiving gear 37 as to have the same number of teeth to improve efficiency and anti-abrasion. The transmission means Y is magnet type described with FIGS. 1 and 2, and the other constructions are similar to that of the transmission in FIG. 3.

Figure 6:
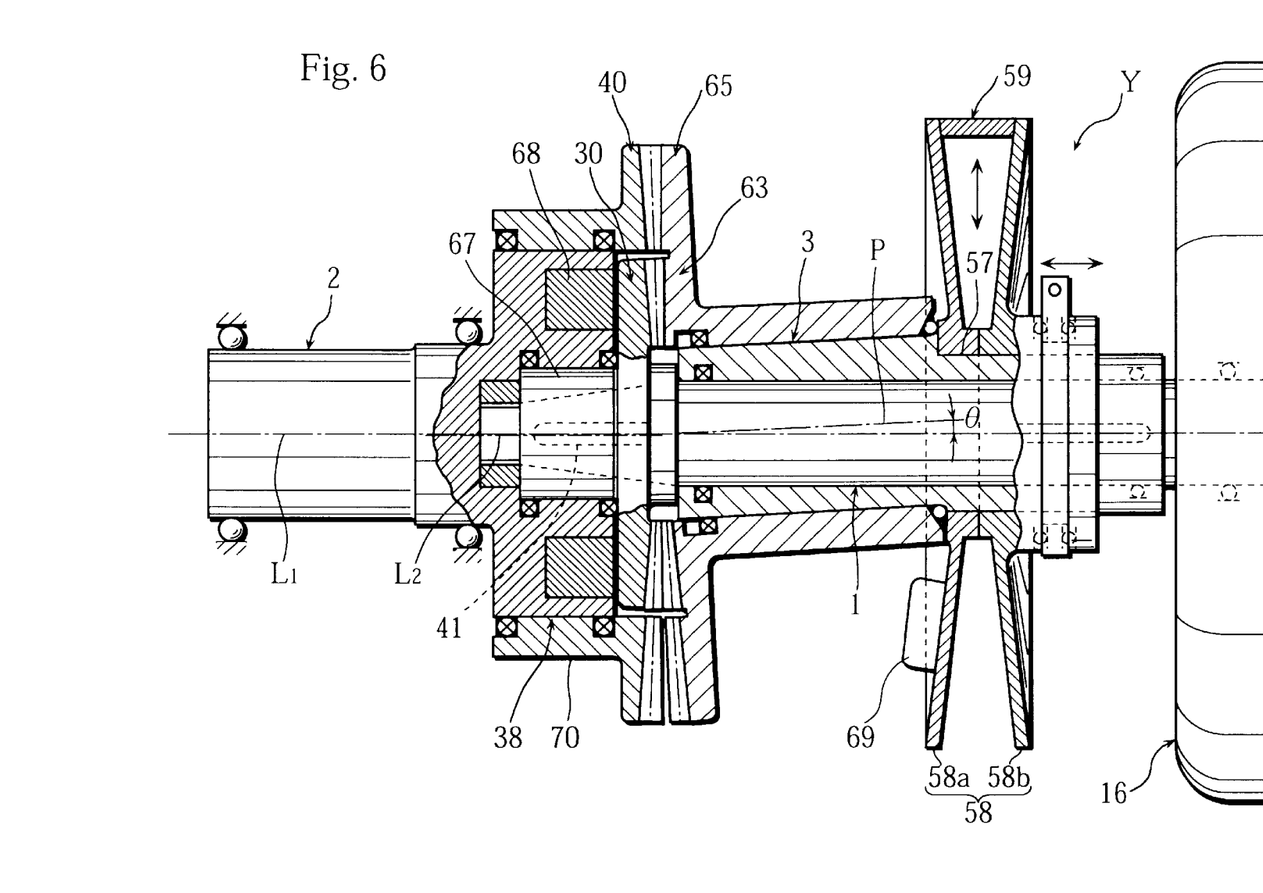
FIG. 6 is a cross-sectional view showing a fifth embodiment of the present invention.

FIG. 6 shows a fifth embodiment of the present invention. This transmission, having an input shaft 1 and an output shaft 2 supported on a first axis $L_1$, is provided with an input gear 30 which unitedly rotates with the input shaft 1 around the first axis $L_1$, a transmission eccentric shaft 3 mounted on the input shaft 1 so as to freely rotate and having a declination axis P crossing the first axis $L_1$ with a predetermined angle θ a force-receiving gear 63 mounted on the transmission eccentric shaft 3 so as to freely rotate around the declination axis P and revolve around the first axis $L_1$ and engaging with the input gear 30, an output eccentric shaft 38 supported on an end portion of the input shaft 1 on the output shaft 2 side so as to freely rotate and having a second axis $L_2$ parallel to the first axis $L_1$, a gear-type transmission clutch portion 65 disposed unitedly with the force-receiving gear 63 as to freely rotate around the declination axis P and freely revolve around the first axis $L_1$, a gear-type force-receiving clutch portion 40 mounted on the output eccentric shaft 38 so as to freely rotate around the second axis $L_2$, and freely revolve around the first axis $L_1$ and engaging with the gear-type transmission clutch portion 65, the output shaft 2 formed unitedly with the output eccentric shaft 38, and a transmission means Y to change revolution speed of the force-receiving gear 63 by rotating the transmission eccentric shaft 3.

Figure 7:
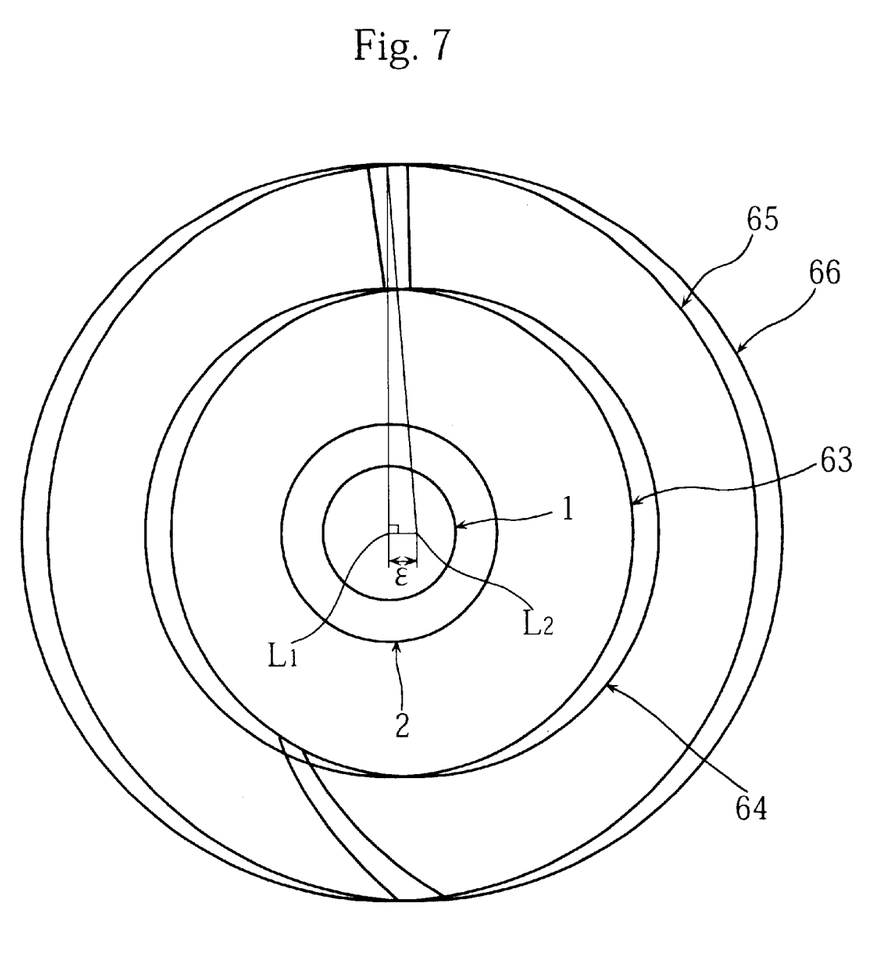
FIG. 7 is an explanatory view showing positional relationship of the gears.

As shown in FIG. 6 and FIG. 7, the second axis $L_2$ parallel to the first axis $L_1$ is on a position eccentric from a plane going through the declination axis P and the first axis $L_1$ for a predetermined dimension ε in a right angle direction (a direction at right angles with the plane of FIG. 6). That is to say, the gear-type force-receiving clutch portion 40 on the second axis $L_2$ forms a crank by partial engagement with the gear-type transmission clutch portion 65. The second axis $L_2$ is shown in FIG. 6 slightly deviated from the first axis $L_1$ for easy explanation. In this case, each of the gears (the gear-type force-receiving clutch portion 40, the gear-type transmission clutch portion 65. the input gear 30, and the force-receiving gear 63) is a spiral bevel gear or a hypoid gear.

The output eccentric shaft 38 is mounted on a ring member 67 attached to a tapered peripheral face on a forth end of the input shaft 1 with a key 41 as to unitedly rotate with the input shaft 1 through a bearing, and a balance weight 68 is embedded in the output eccentric shaft 38. The transmission means Y is constructed such that the pulley 58, composed of the fixed first half body 58a on the forth end side and the movable second half body 58b on the base end side, is disposed so as to unitedly rotate with the cylinder portion 57 formed unitedly with the base end side of the transmission eccentric shaft 3, the torque from the motor (not shown) is transmitted to the pulley 58 through the belt 59, and the revolving speed of the transmission eccentric shaft 3 around the first axis $L_1$ is changed by changing the rotation speed of the pulley 58 by moving the belt 59 in the diameter direction (as described with FIG. 3). A balance weight 69 is attached to the first half body 58a of the pulley 58.

Next, working of the transmission is described. In a static state of the transmission means Y (a static state of the transmission eccentric shaft 3), when the input gear 30 is rotated by the rotation of the input shaft 1, the force-receiving gear 63 and the gear-type transmission clutch portion 65 do not revolve around the first axis $L_1$ but only rotate around the declination axis P. Therefore, the cylinder portion 70 of the gear-type force-receiving clutch portion 40 engaged with the gear-type transmission clutch portion 65 only rotates around the output eccentric shaft 38 which is in static state, and the output shaft 2 is static.

In this state, as the pulley 58 of the transmission means Y is rotated in the same direction and at the same speed with the input shaft 1, the transmission eccentric shaft 3 revolves around the first axis $L_1$, and also the force-receiving gear 63 revolves around the first axis $L_1$. Therefore, the gear-type transmission clutch portion 65 and the gear-type force-receiving clutch portion 40 revolve around the first axis $L_1$, the output eccentric shaft 38 revolves around the first axis $L_1$, and the output shaft 2 rotates (in the same direction and at the same speed with the input shaft 1). Transmission of the output shaft 2 can be controlled with constant output within all ranges by changing the revolution speed of the transmission eccentric shaft 3 around the first axis $L_1$ with the transmission means Y.

Figure 8:
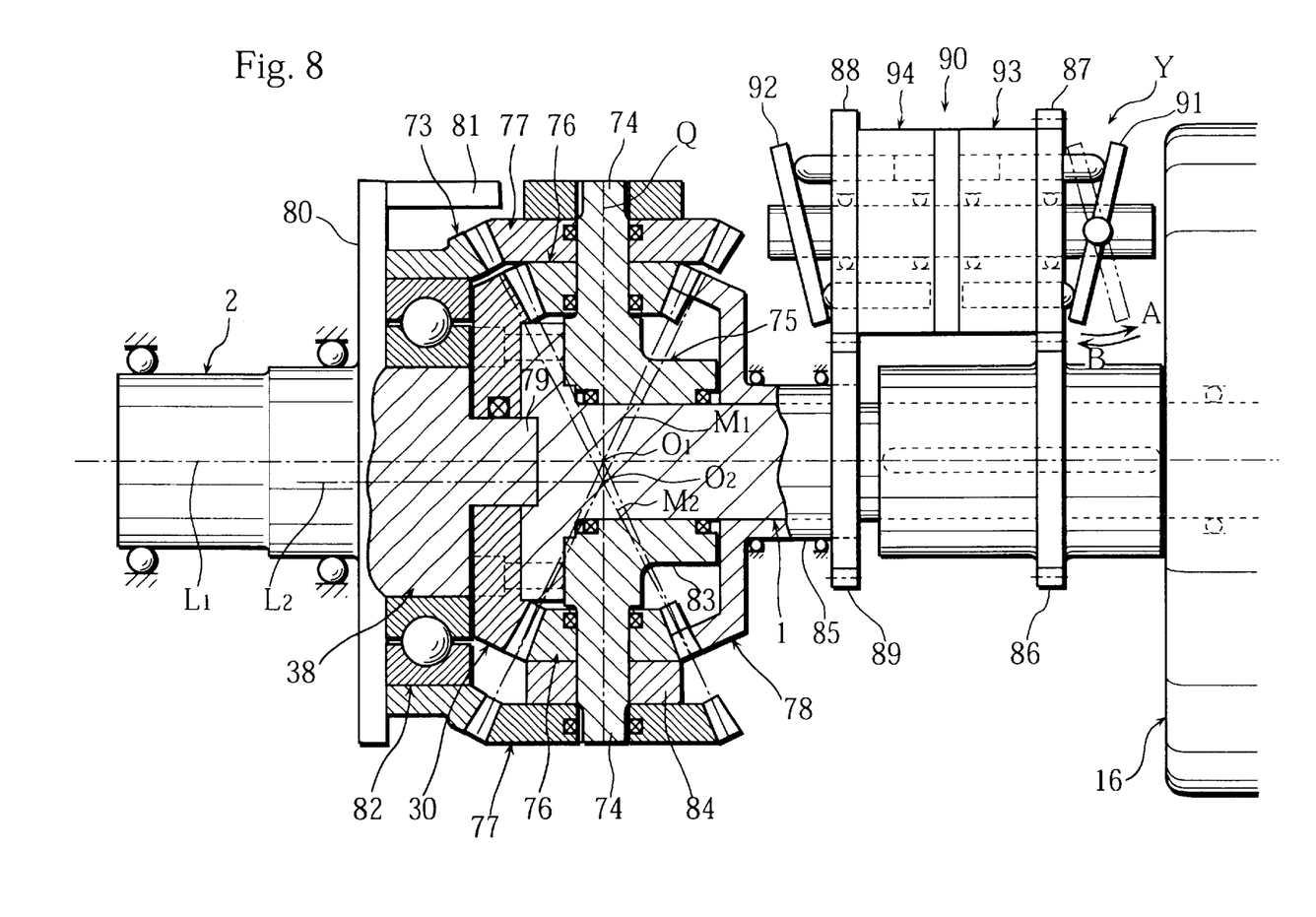
FIG. 8 is a cross-sectional view showing a sixth embodiment of the present invention.

FIG. 8 shows a sixth embodiment of the present invention. This transmission, having an input shaft 1 and an output shaft 2 supported on a first axis $L_1$, is provided with an input gear 30 which unitedly rotates with the input shaft 1 around the first axis $L_1$, an output eccentric shaft 38 supported on an end portion of the input shaft 1 on the output shaft 2 side as to freely rotate and of which axis is a second axis $L_2$ parallel to the first axis $L_1$, a force-receiving gear 73 mounted on the output eccentric shaft 38 so as to freely revolve around the first axis $L_1$, a planetary carrier 75 outserted to the input shaft 1 as to freely rotate around the first axis $L_1$ and having an attachment shaft portion 74 at right angles with the first axis $L_1$, a first planet gear 76 and a second planet gear 77 attached to the attachment shaft portion 74 of the planetary carrier 75 and engaged with the input gear 30 and the force-receiving gear 73, a transmission gear 78 outserted to the input shaft 1 as to freely rotate and engaged with the first planet gear 76, the above output shaft 2 formed unitedly with the output eccentric shaft 38, and a transmission means Y which changes rotation speed of the transmission gear 78.

The input shaft 1 has a concave portion opening to the output shaft 2 side and an outer brim portion on the forth end, and the input gear 30 having a central hole portion is fixed to a forth end face of the outer brim portion with a bolt so as to direct teeth of the input gear 30 to the base end side. In this case, the input gear 30 is a bevel gear.

The output eccentric shaft 38 has a small diameter shaft portion 79 having a first axis $L_1$ on the base end face, and the small diameter shaft portion 79 is inserted to the central hole portion of the input gear 30 through a bearing and to the concave portion of the input shaft 1. An outer brim portion 80 is formed on the extended end side of the output eccentric shaft 38, and a balance weight 81 is attached to the outer brim portion 80.

The mark 82 represents a radial ball bearing outserted to the output eccentric shaft 38, an inner ring of the radial ball bearing 82 is fixed to a peripheral face of the output eccentric shaft 38, and the force-receiving gear 73 is mounted on and fixed to an outer ring of the radial ball bearing 82. The force-receiving gear 73 is a bevel gear.

The planetary carrier 75 has a cylinder portion 83 outserted to the input shaft 1 through a bearing, and two above-mentioned attachment shaft portions 74 protruding from a peripheral face on a forth end of the cylinder portion 83 in directions at right angles with the first axis $L_1$ as to have a central angle of 180°. In a state such that the pair of attachment shaft portions 74 is disposed on a plane going through the first and second axes $L_1$ and $L_2$, the first planet gear (bevel gear) 76 and the second planet gear (bevel gear) 77 are attached to each of the attachment shaft portions 74 through bearings. The mark 84 represents a spacer. In this case, an extended line $M_1$ of an engagement point on which the input gear 30 and the first planet gear 76 engage goes through an intersection point $O_1$, on which an orthogonal axis Q (the axis of the attachment shaft portion 74) crosses the first axes $L_1$. An extended line $M_2$ of an engagement point on which the force-receiving gear 73 and the second planet gear 77 engage goes through an intersection point $O_2$ on which the second axis $L_2$ crosses the orthogonal axis Q.

The transmission means Y is provided with a cylinder portion 85 continuing from a base end face of the transmission gear (bevel gear) 78 and mounted on the input shaft 1 so as to freely rotate, a fourth gear 89 for transmission formed on a forth end of the cylinder portion 85, a first gear 86 for input formed on the input shaft 1 on a base end side to the fourth gear 89 through a key, etc., so as to unitedly rotate, an oil-hydraulic pump portion 93 having a second gear 87 engaged with the first gear 86, and an axial plunger pump converter 90 having an oil-hydraulic motor portion 94 having a third gear 88 engaged with the fourth gear 89. In the pump converter 90, 91 represents a transmission-regulating inclination board oscillatable on the oil-hydraulic pump portion 93 side, and 92 represents a fixed output inclination board on the oil-hydraulic motor portion 94 side.

Next, working of this transmission is described. In a state in which the transmission-regulating inclination board 91 of the pump converter 90 is inclined (as FIG. 8), the input gear 30 and the first gear 86 of the transmission means Y are rotated when the input shaft 1 is rotated. The second gear 87 of the pump converter 90 is rotated by the rotation of the first gear 86, oil from the oil-hydraulic pump portion 93 is supplied to the oil-hydraulic motor portion 94 to rotate the third gear 88, and the transmission gear 78 is rotated in the same direction and at the same speed with the input shaft 1 through the fourth gear 89 and the cylinder portion 85. Then, the first planet gear 76, engaged with both of the input gear 30 and the transmission gear 78, rotates with the planetary carrier 75 in the same direction and at the same speed with the input shaft 1 without rotating around the attachment shaft portion 74. That is to say, a pair of the second planet gears 77 rotate with the planetary carrier 75 in the same direction and at the same speed with the input shaft 1, the force-receiving gear 73 engaged with the second planet gears 77 revolves around the first axis $L_1$, and the output shaft 2 rotates in the same direction and at the same speed with the input shaft 1.

In this state, because the inclination board 91 of the oil-hydraulic pump portion 93 is oscillated in a direction of an arrow A (a direction at right angles with the input shaft 1), the rotation of the third gear 88 of the oil-hydraulic motor portion 94 is slowed down as the oil-hydraulic pressure from the oil-hydraulic pump portion 93 becomes low, and the rotation speed of the transmission gear 78 becomes lower than that of the input gear 30. Then, each of the first planet gears 76, rotating around the attachment shaft portion 74, revolves around the first axis $L_1$ when the third gear 88 of the oil-hydraulic motor portion 94 and the transmission gear 78 stop. That is to say, the rotation speed of the planetary carrier 75 becomes half of that of the input shaft 1. Therefore, the revolution speed of the force-receiving gear 73 and the output eccentric shaft 38 around the first axis $L_1$ becomes half, and the rotation speed of the output shaft 2 is reduced to half.

Further, the third gear 88 of the oil-hydraulic motor portion 94 begins to rotate in the opposite direction (the same rotation direction with the input shaft 1) as the inclination board 91 of the oil-hydraulic pump portion 93 of the pump converter 90 is inclined in the opposite direction (as shown with an imaginary line), and the transmission gear 78 begins to rotate in an opposite direction from the input shaft 1. Then, when the rotation speed of the transmission gear 78 becomes the same as that of the input shaft 1, the first planet gears 76 only revolve and the planetary carrier 75 stops. Therefore, the revolution of the force-receiving gear 73 around the first axis $L_1$ and the revolution of the output eccentric shaft 38 around the first axis $L_1$ stop, and the output shaft 2 is stopped thereby. The planetary carrier 75 begins the rotation again as the inclination board 91 is oscillated in a direction of an arrow B, the second axis $L_2$ revolves around the first axis $L_1$, and the output shaft 2 rotates.

Figure 9:
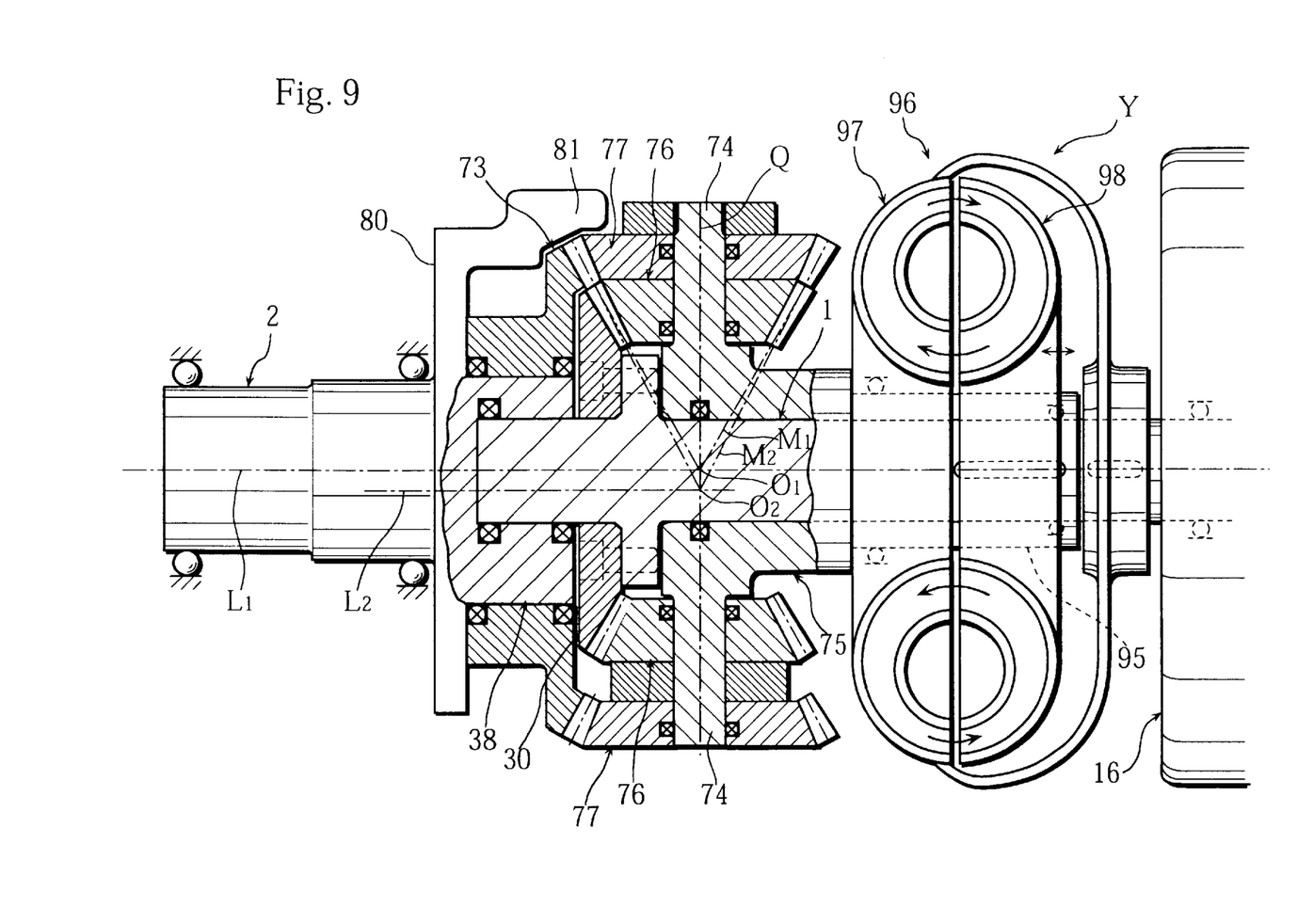
FIG. 9 is a cross-sectional view showing a seventh embodiment of the present invention.

Next, FIG. 9 shows a seventh embodiment of the present invention. This transmission is constructed such that the transmission gear 78 of the transmission described with FIG. 8 is omitted, and the planetary carrier is rotated and stopped by the transmission means Y regulating the rotation speed of the planetary carrier.

The transmission means Y is provided with a cylinder portion 95 continuing from a base end face of the planetary carrier 75 and outserted to the input shaft 1 through a bearing, and a torque converter 96. The torque converter 96 is provided with an impeller 97 on the input side attached to the input shaft 1 with a key, etc., so as to rotate unitedly with the input shaft 1, and an impeller 98 on the force-receiving side attached to the cylinder portion 95 with a slide key, etc., so as to rotate unitedly with and slide in the axis direction on the cylinder portion 95.

In this transmission, when the impeller 97 on the input side and the impeller 98 on the force-receiving side are sufficiently separated from each other, the impeller 98 on the force-receiving side does not rotate even if the input shaft 1 rotates, and the planetary carrier 75 is static. Therefore, the second planet gears 77 and the force-receiving gear 73 are in the static state, and the output eccentric shaft 38 and the output shaft 2 are static. Each of the planet gears 76 is rotated around the attachment shaft portion 74 by the rotation of the input gear 30.

In this state, because the impeller 98 on the force-receiving side becomes close to the impeller 97 on the input side, the planetary carrier 75 rotates with the impeller 98 on the force-receiving side in the same rotation direction as the input shaft 1, the force-receiving gear 73 engaged with the second planet gears 77 and the output eccentric shaft 38 revolve around the first axis $L_1$, and the output shaft 2 is rotated in the same direction as the input shaft 1. When the planetary carrier 75 has the same rotation speed as the input shaft 1, the rotation speed of the output shaft 2 becomes the same as that of the input shaft 1 to complete the transmission work.

As described above, transmission of the output shaft 2 can be controlled with constant output within all ranges by changing the rotation speed of the planetary carrier 75 by the torque converter 96. The torque converter can be smaller than conventionally-used torque converters. For example, a torque converter for a compact car can be sufficiently used for a large truck to improve efficiency. Although a conventional transmission for automobiles has a disadvantage in that motor power may be excessively strong or weak because the transmission is conducted steppingly without a value between the steps, the present invention can always keep appropriate rotation which is effective for saving energy and low-emission.

Figure 10:
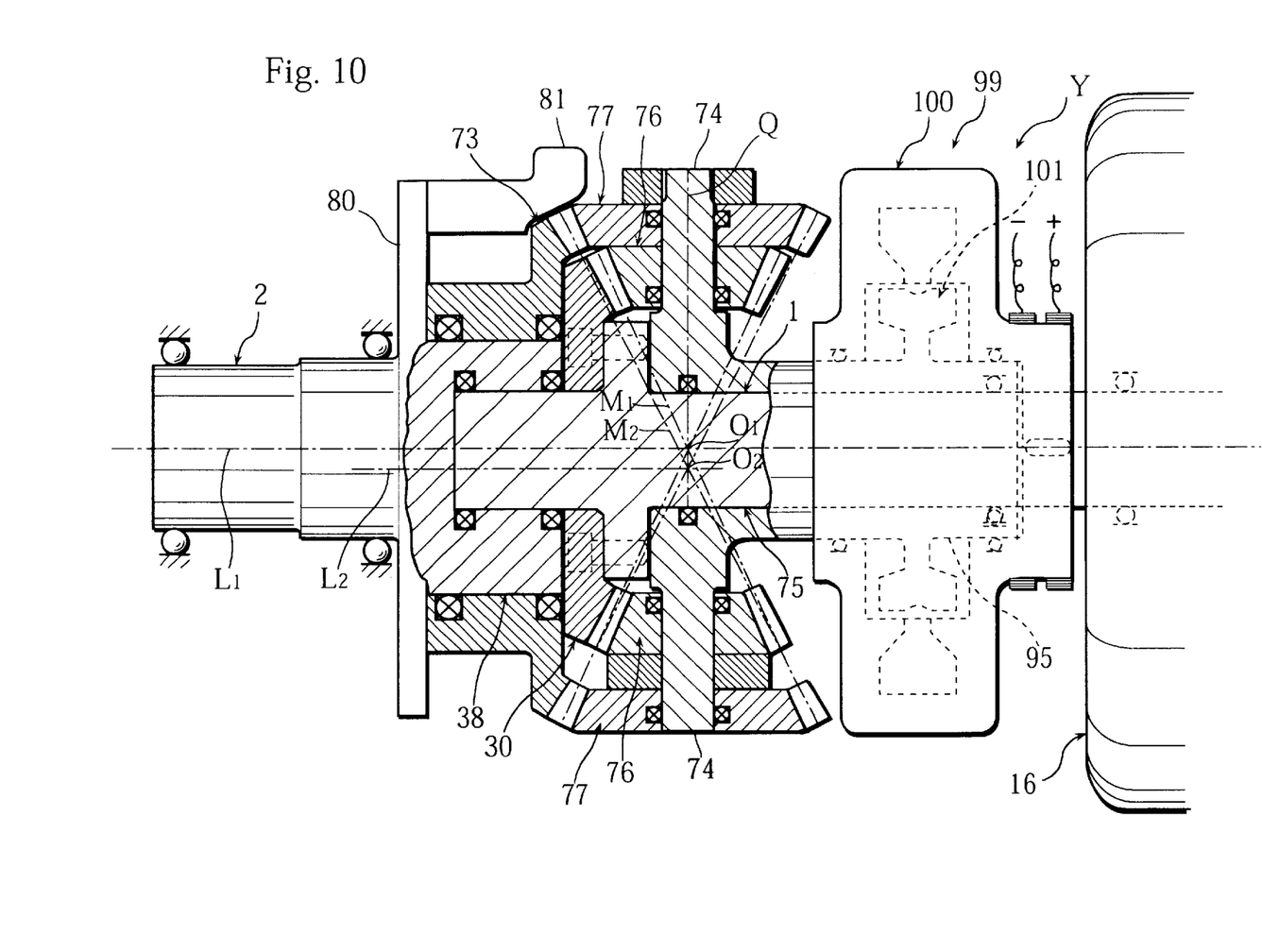
FIG. 10 is a cross-sectional view showing a eighth embodiment of the present invention.

Next, FIG. 10 shows an eighth embodiment of the present invention. In this transmission, an electromagnetic powder clutch 99 is used instead of the torque converter 96 of the transmission means Y in FIG. 9. The electromagnetic powder clutch 99 is provided with an electromagnet portion 100 which can unitedly rotate with the input shaft 1 and a force-receiving iron core portion 101 formed on the cylinder portion 95 continuing from the planetary carrier 75 as to unitedly rotate.

In this transmission, when the electromagnetic powder clutch 99 is not electrified, the planetary carrier 75 does not rotate even if the electromagnet portion 100 rotates with the input shaft 1. Therefore, the output shaft is static. In this state, when the electromagnetic powder clutch 99 is electrified, powder (iron powder) connects the electromagnet portion 100 and the force-receiving iron core portion 101 to rotate the planetary carrier 75 in the same direction with the input shaft 1, and the output shaft 2 rotates in the same direction with the input shaft 1. In this case, the rotation speed of the planetary carrier 75 can be changed by changing the degree of the connection of the powder by regulating the strength of electricity.

In the present invention, not restricted to the embodiments described above, for example, the magnet type transmission means Y in FIG. 1 may be replaced with the pulley rotation drive type (in FIG. 3), the torque converter (in FIG. 9), or transmission means Y of other types. It is preferable to conduct the transmission work by the transmission means Y with servocontrol and micro computers.

In the transmission in FIG. 3, an external gear as the input gear 30 and an internal gear as the force-receiving gear 37 may engage, and the gear-type transmission clutch portion 39 and the gear-type force-receiving clutch portion 40 may be constructed as an internal-external gear portion. In the transmission in FIG. 2, the input gear 30 may be directed to the force end and the force-receiving gear portion 32 may be directed to the base end to engage.

In the transmission described with FIGS. 8 through 10, the first planet gear 76 and the second planet gear 77 may be unified and attached to the attachment shaft portion 74 as to freely rotate. In this case, the force-receiving gear 73 is rotated around the second axis $L_2$ by the rotation of the input gear 30 in the static state of the planetary carrier 75.

According to the transmission of the present invention, the output shaft 2 can be changed to desirable rotation speed steplessly and in all ranges only by changing the revolution speed of the transmission eccentric shaft 3 and the transmission input plate 4 with the transmission means Y, and efficiency is improved so as to provide a sufficient torque output in low-speed range.

Power is transmitted smoothly, efficiency is extremely good with little power loss, and the transmission work can be conducted with high efficiency and within a wide transmission range because the universal joint portion 8, omitting gears, is used as a power transmission route between the input shaft 1 and the output shaft 2.

Working noise is small and the transmission is compact and made economically for omission of the gears.

The transmission input plate 4 is moved like a turntable by receiving the reaction of the output shaft 2 with the automatic aligning roller bearing 9 to return the reaction to the output shaft 2 side, and the transmission eccentric shaft 3, without rotation by the reaction, can be rotated smoothly by the transmission means Y.

The output shaft 2 can be changed to desirable rotation speed steplessly and in all ranges only by changing the revolution speed of the transmission eccentric shaft 3 and the transmission input plate 4 with the transmission means Y, power loss is reduced to about bearing loss, and efficiency is improved by sufficient torque output in low-speed range.

Bearings are protected by the gear-type transmission clutch portion 39 and the gear-type force-receiving clutch portion 40 to escape eccentric power in diameter direction.

The transmission composed of parts having simple configuration and construction such as gears is easy to operate and assemble.

While preferred embodiments of the present invention have been described in this specification, it is to be understood that the invention is illustrative and not restrictive, because various changes are possible within the spirit and indispensable features.

What is claimed is:

1. A transmission provided with an input shaft and an output shaft supported on a first axis as to freely rotate, comprising:

a transmission eccentric shaft having a declination axis crossing the first axis at a predetermined angle, mounted on the input shaft so as to freely rotate;

a transmission input plate mounted on the transmission eccentric shaft so as to freely rotate around the declination axis and revolve around the first axis;

an output eccentric shaft arranged on the declination axis, supported on an end portion of the input shaft on the output shaft side so as to freely rotate;

a universal joint portion having a casing portion mounted on the output eccentric shaft so as to freely rotate around the declination axis and revolve around the first axis and which is provided with a revolution force around the first axis by contact with the transmission input plate, and a joint main body connecting the casing portion to the input shaft;

the output shaft formed unitedly with the output eccentric shaft; and a transmission means rotating the transmission eccentric shaft to change a revolution speed of the transmission input plate.

2. The transmission as set forth in claim 1, wherein the transmission input plate is mounted on the transmission eccentric shaft through an automatic aligning roller bearing.

* * * * *